J. GOODMAN.
Rotary Churn.
No. 164,293. Patented June 8, 1875.
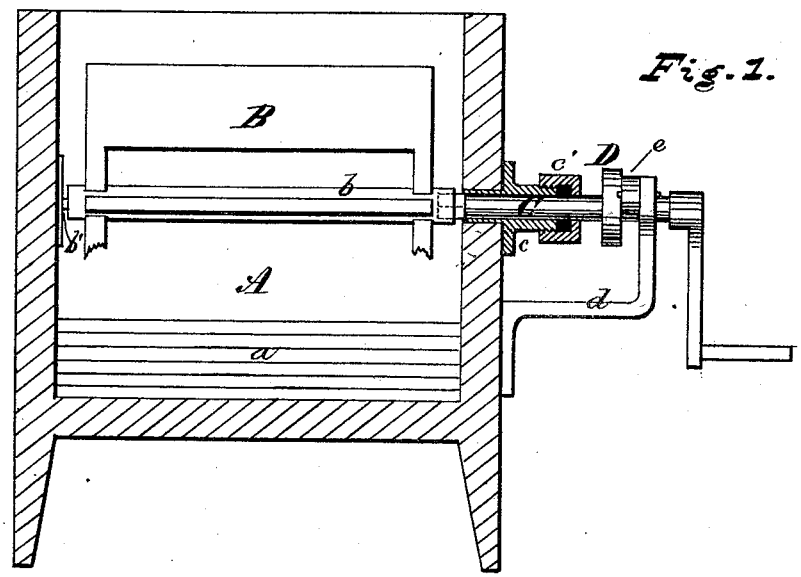
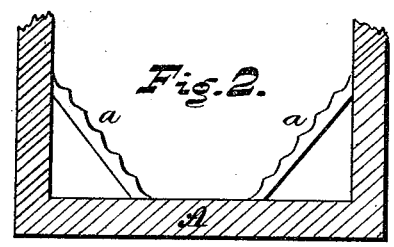
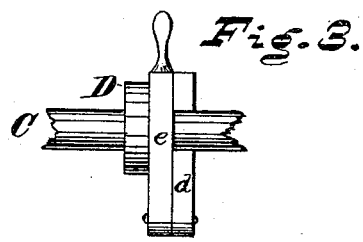
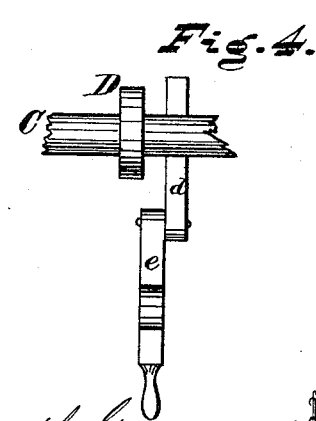
Witnesses
Frank A. Pollock
Edwin Gwinner
Joseph Goodman, Inventor
By Connolly Bros & McTighe, Attorneys
THE GRAPHIC CO.PHOTO-LITH.39 & 41 PARK PLACE,N.Y.

UNITED STATES PATENT OFFICE.

JOSEPH GOODMAN, OF PITTSBURG, PENNSYLVANIA.

IMPROVEMENT IN ROTARY CHURNS.

Specification forming part of Letters Patent No. 164,293, dated June 8, 1875; application filed April 6, 1875.

*To all whom it may concern:*

Be it known that I, JOSEPH GOODMAN, of Pittsburg, in the county of Allegheny and State of Pennsylvania, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation, partly sectional. Fig. 2 is a transverse section of bottom and sides. Fig. 3 is a plan of crank, shoulder, and dog. Fig. 4 is the same, with dog thrown back.

This invention has relation to churns; and consists in the novel construction and arrangement of parts, substantially as hereinafter described and claimed.

Referring to the accompanying drawings, A is the churn, with two inclined and fluted (horizontally) portions, $a$, so set that the grooves will not hold cream or water when washed. B is the paddle-wheel, of any description, with its spindle $b$ formed with a step for the pivot $b'$, fixed inside the wall of the churn. At the other end of the spindle $b$ is a square (or equivalent shaped) socket, into which fits the corresponding end of the crank-shaft C. The crank-shaft C passes through the walls of the churn through a metallic journal, which is a portion of the stuffing-box $c$ on the outside, which forms a water-tight joint. Outside the stuffing-box, on the shaft, there is an annular shoulder, D, beyond which the shaft continues a short distance, and terminates at a bearing on the bracket $d$, jutting out from the churn-wall. On this bracket is pivoted laterally a dog or lever, $e$, which fits around half of the shaft, and falls beyond and alongside the shoulder D.

To get access to the contents of the churn, the dog $e$ is lifted from beyond the shoulder D, whereupon the shaft can be withdrawn far enough to have its end disengaged from the socket in the spindle, after which the paddle may be removed alone. It is shipped into place by reversing the operation.

When the lid is on there is not an opening in the churn, and consequently splashing and leaking are prevented.

The results are greater production, clean and tidy churning, and ready access to the contents.

I am aware that stuffing-boxes are old, and therefore, disclaiming all other uses of them, I confine myself strictly to their herein specified use on churns, to prevent disagreeable leakage and provide a secure bearing for the shaft.

I am well aware that channeled inclines have heretofore been used in the bottoms of churns for the purpose of breaking the cream. I therefore do not broadly claim the same as an original feature. My improvement, however, consists in so shaping the channels that their lower surface shall be inclined in substantially the manner shown, instead of being horizontal, depressed, or angular. The object of said construction is to prevent the lodgment of the cream or water, and thereby avoid the souring of the churn, which is liable to occur when the channeled surface is horizontal, angular, or depressed.

Having described my invention fully, what I claim is as follows:

The projecting L-shaped bracket $d$, recessed at its upper end, and holding the grooved dog or clamp $e$, in combination with the sliding shaft C, having the shoulder D, working in the stuffing-box $c$ $c'$, substantially as shown and described, and for the purpose specified.

In testimony that I claim the foregoing I have hereunto set my hand this 31st day of March, 1875.

JOSEPH GOODMAN.

Witnesses:
T. J. McTIGHE,
A. CORCORAN.